(12) United States Patent
AlAdawy et al.

(10) Patent No.: US 11,598,177 B2
(45) Date of Patent: Mar. 7, 2023

(54) WELLBORE SYSTEM, A MEMBER AND METHOD OF MAKING SAME

(71) Applicants: Ahmed AlAdawy, Dhahran (SA); Ameen Malkawi, Dhahran (SA); Raghavaraju Lakhamraju, Dhahran (SA); Naeem-Ur Minhas, Romford (GB); Sandip Maity, Manama (BH)

(72) Inventors: Ahmed AlAdawy, Dhahran (SA); Ameen Malkawi, Dhahran (SA); Raghavaraju Lakhamraju, Dhahran (SA); Naeem-Ur Minhas, Romford (GB); Sandip Maity, Manama (BH)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 0 days.

(21) Appl. No.: 17/885,138

(22) Filed: Aug. 10, 2022

(65) Prior Publication Data
US 2022/0381112 A1   Dec. 1, 2022

Related U.S. Application Data

(62) Division of application No. 16/853,134, filed on Apr. 20, 2020, now Pat. No. 11,506,016.

(51) Int. Cl.
| | | |
|---|---|---|
| *E21B 34/08* | (2006.01) | |
| *E21B 43/12* | (2006.01) | |
| *E21B 34/06* | (2006.01) | |
| *B33Y 80/00* | (2015.01) | |
| *F16K 31/12* | (2006.01) | |
| *B33Y 40/20* | (2020.01) | |
| *B33Y 10/00* | (2015.01) | |

(52) U.S. Cl.
CPC ............. *E21B 34/06* (2013.01); *B33Y 10/00* (2014.12); *B33Y 40/20* (2020.01); *B33Y 80/00* (2014.12); *F16K 31/12* (2013.01)

(58) Field of Classification Search
CPC .......... E21B 34/08; E21B 43/12; E21B 43/14
See application file for complete search history.

(56) References Cited

U.S. PATENT DOCUMENTS

| | | |
|---|---|---|
| 7,290,606 B2 | 11/2007 | Coronado et al. |
| 7,913,765 B2 | 3/2011 | Crow et al. |
| (Continued) | | |

FOREIGN PATENT DOCUMENTS

| | | |
|---|---|---|
| EP | 3532699 A1 | 9/2019 |
| WO | 2018080313 A1 | 5/2018 |
| WO | 2019160423 A1 | 8/2019 |

OTHER PUBLICATIONS

The DAR Technology; A technology based on the ERV© invention by Innowell; published 2018; 2 pages; https://www.innowell.no/.
(Continued)

*Primary Examiner* — Kipp C Wallace
(74) *Attorney, Agent, or Firm* — Cantor Colburn LLP

(57) ABSTRACT

A member that is a single element for controlling flow through an inflow control device, has anisotropic density configured to move the member relative to the inflow control device such that the inflow control device allows, fully blocks, or partially blocks flow from a zone to a production string based on a density of a fluid flowing into the inflow control device from the zone.

5 Claims, 6 Drawing Sheets

(56) References Cited

U.S. PATENT DOCUMENTS

| | | |
|---|---|---|
| 8,544,548 B2 | 10/2013 | Coronado et al. |
| 8,631,876 B2 | 1/2014 | Xu et al. |
| 8,757,266 B2 | 6/2014 | Dykstra et al. |
| 8,833,466 B2 | 9/2014 | Zhou |
| 8,839,849 B2 | 9/2014 | Guest et al. |
| 9,453,395 B2 | 9/2016 | Fripp et al. |
| 9,714,709 B2 | 7/2017 | Lei et al. |
| 9,840,889 B2 | 12/2017 | Killie et al. |
| 10,378,303 B2 | 8/2019 | Hayter et al. |
| 10,612,345 B2 | 4/2020 | Bayh et al. |
| 11,105,425 B2 | 8/2021 | Feng et al. |
| 2008/0041581 A1 | 2/2008 | Richards |
| 2008/0041582 A1 | 2/2008 | Saetre et al. |
| 2009/0101354 A1 | 4/2009 | Holmes et al. |
| 2009/0114395 A1 | 5/2009 | Holmes et al. |
| 2011/0108749 A1 | 5/2011 | Xu et al. |
| 2011/0266001 A1 | 11/2011 | Dykstra et al. |
| 2015/0040990 A1 | 2/2015 | Mathiesen et al. |
| 2019/0063182 A1 | 2/2019 | Fripp et al. |
| 2019/0211648 A1* | 7/2019 | Davies .................. B33Y 80/00 |
| 2019/0249519 A1* | 8/2019 | Aadnøy .................. E21B 34/06 |
| 2019/0264535 A1 | 8/2019 | Killie et al. |
| 2020/0063518 A1 | 2/2020 | Fripp et al. |
| 2020/0064871 A1 | 2/2020 | Fripp et al. |
| 2020/0291745 A1 | 9/2020 | Greci et al. |
| 2021/0324707 A1 | 10/2021 | Aladawy et al. |

OTHER PUBLICATIONS

Zeng, et al.; "A Novel Autonomous Inflow Control Device Design: Improvements to Hybrid ICD"; IPTC-1776-MS; IPC , Malaysia Dec. 10-12, 2014; 9 pages.

\* cited by examiner

WELLBORE SYSTEM, A MEMBER AND METHOD OF MAKING SAME

CROSS REFERENCE TO RELATED APPLICATIONS

This application is a divisional application and claims the benefit of an earlier filing date from U.S. Non-Provisional application Ser. No. 16/853,134 filed Apr. 20, 2020, the entire disclosure of which is incorporated herein by reference.

BACKGROUND

In the resource recovery industry, it is common to also recover water in addition to target production fluids, such as oil for example. The portion of the total production that is water, also referred to as the watercut or WC, can vary over the life of a well or zones of a well. Increases in the WC as a well ages is also common. It may be desirable to limit production from portions of a well that have WC above selected values. Conventional systems and methods for achieving this goal serve the purpose for which they were designed, however improvements in effectiveness and efficiency are always of interest.

SUMMARY

Disclosed herein is a wellbore system having a production string, an inflow control device positioned at a zone along the production string, and a member that is a single element and in operable communication with the inflow control device. The member has anisotropic density and is configured to move relative to the inflow control device to cause the inflow control device to allow, fully block or partially block flow from the zone to the production string based on a density of a fluid flowing into the inflow control device from the zone.

Also disclosed herein is a member that is a single element for controlling flow through an inflow control device. The member has anisotropic density configured to move the member relative to the inflow control device such that the inflow control device allows, fully blocks, or partially blocks flow from a zone to a production string based on a density of a fluid flowing into the inflow control device from the zone.

Also disclosed herein is, a method of making a valve arrangement for an inflow control device. The valve arrangement has a member in operable communication with a flow passageway, the member is movable between at least a first position and a second position, the member allows flow through the flow passageway when in the first position, blocks flow through the flow passageway when in the second position, and allows partial flow through the flow passageway when in any position between the first position and the second position. The method includes; depositing material layer-by-layer, and adhering each new layer to the previously deposited layer, thereby building via additively manufacturing, the member such that the member is a single element having anisotropic density such that a first end density of a first end of the member is greater than a second end density of a second end of the member. Also, the first end density and the second end density are both either greater than or both less than a target fluid density of a target production fluid and both are either greater than or both are less than a first fluid density of an unwanted production fluid. Further, the first end density is less than a second fluid density, the second end density is greater than the second fluid density, and the second fluid density is between the target fluid density and the first fluid density.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed arrangement and method are presented herein by way of exemplification and not limitation with reference to the Figures.

Figure 1:
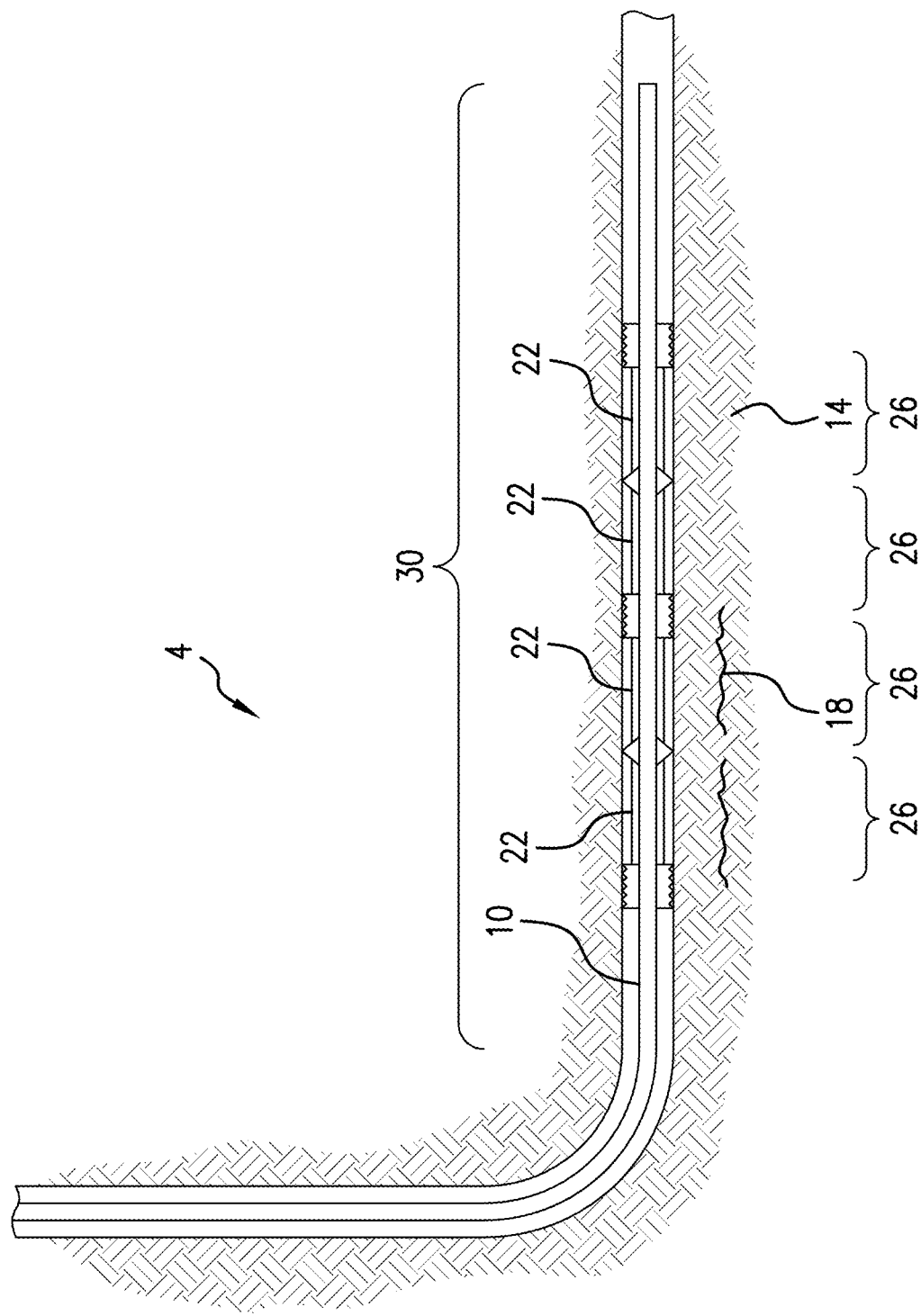
FIG. 1 depicts a well with a production string positioned within a formation with a plurality of production zones along a horizontal run.

Referring to FIG. 1, a production string 10 is shown positioned within a formation 14 for recovery of a target production fluid 18. A plurality of inflow control devices 22 are positioned along the production string 10 at a plurality of zones 26 along a horizontal run 30 of the formation 14.

Figure 2:
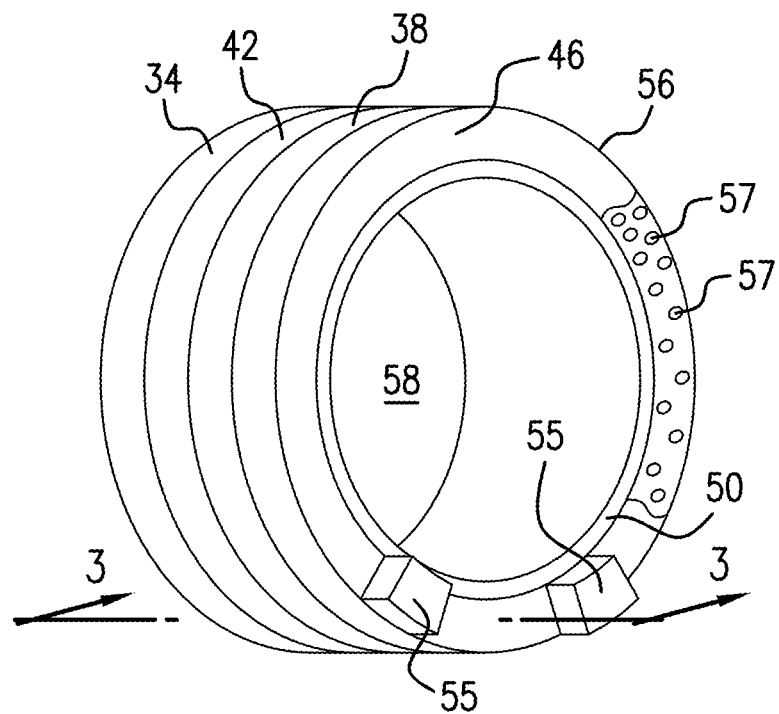
FIG. 2 depicts an inflow control device disclosed herein.
Figure 3:
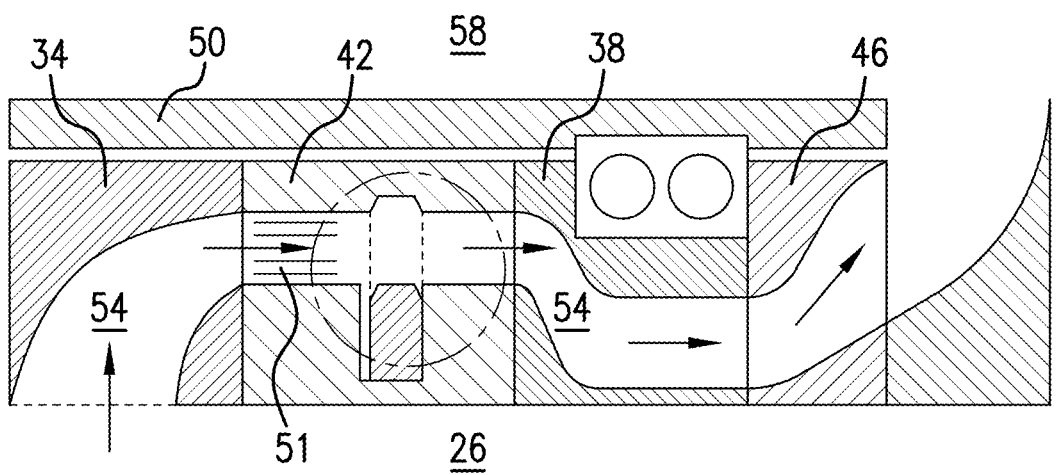
FIG. 3 depicts a cross sectional view of the inflow control device of FIG. 2 taken at arrows 3-3 in FIG. 2.
Figure 5A:
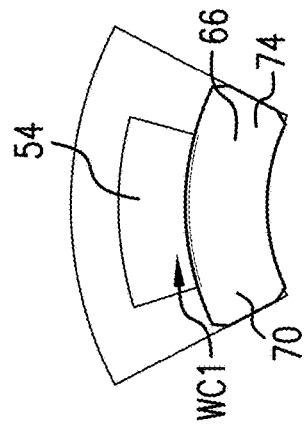
FIGS. 5A-5C depict cross sectional views of a valve portion of a valve arrangement of FIG. 4 at three different valve positions taken along arrows 5-5.
Figure 5B:
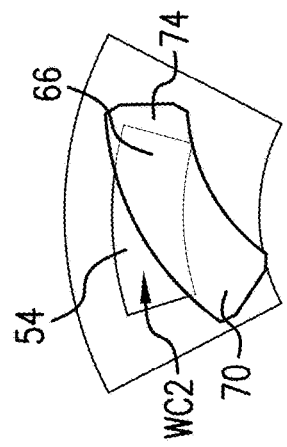
Figure 5C:
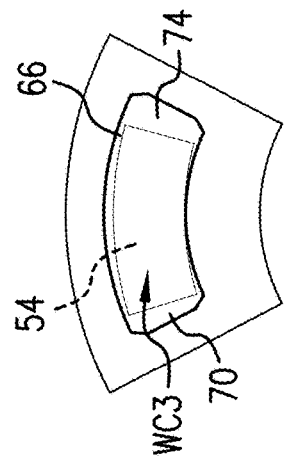
Figure 4:
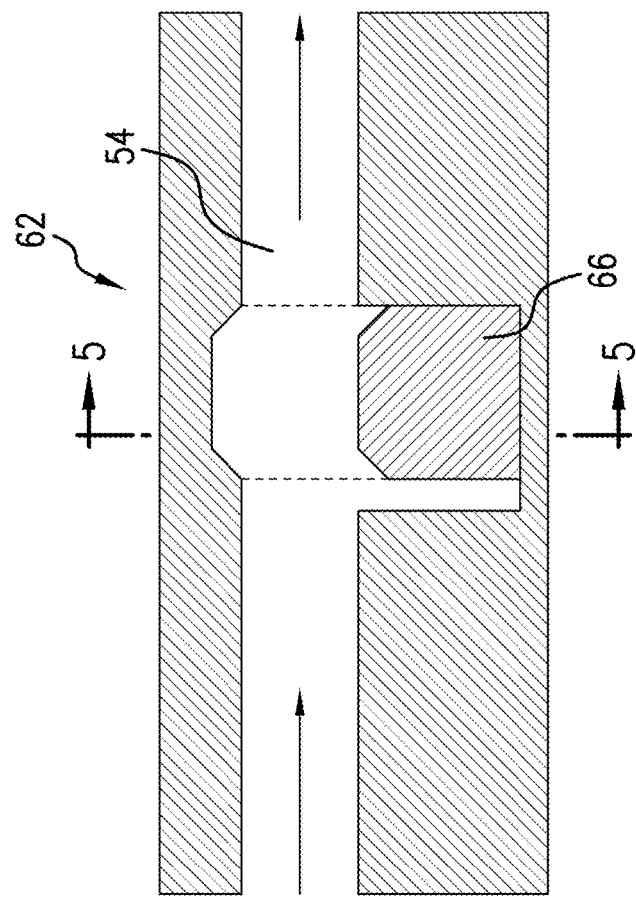
FIG. 4 depicts a magnified view of a valve arrangement circled in FIG. 3.

Referring to FIG. 2, each of the inflow control devices 22 include an intake module 34, a bearing module 38, a float module 42, and an orientation module 46, all positioned about a sleeve 50. The orientation module 46 is in operable communication with the float module 42 and is configured to rotate the float module 42 relative to direction of gravitational forces, this direction being down in FIG. 2. A flow passageway 54 is defined collectively through the modules 34, 38, 42, 46. The flow passageway 54 is in fluidic communication between a production zone 26 and an internal area 58 of the sleeve 50 through which produced fluid flows. While the orientation module 46 described above is configured to move just the float module 42, it is contemplated that other embodiments could be configured to move the entire inflow control device 22.

The orientation module 46 may have weights 55 attached near a radial perimeter 56 to cause rotation thereof. Alternately, or in addition to the weights 55, the orientation module 46 may be made with internal voids 57 distributed therethrough to cause the rotation thereof relative to gravity.

A flow conditioner 51, can also be included in the inflow control device 22 upstream of a member 66 configured to mix at least the target production fluid 18 and water flowing through the inflow control device 22 to increase homogeneity of the fluids being mixed.

Referring to FIGS. 4 and 5A-5C, a valve arrangement 62, of the float module 42, includes the at least one member 66, with just one being illustrated in this embodiment. The member 66 is a single element and is in operable communication with the flow passageway 54 and is movable between at least a first position shown in FIG. 5A, any position between the first position and the second position shown in FIG. 5B, and a second position shown in FIG. 5C. The member 66 allows full flow through the flow passageway 54 when in the first position, blocks flow through the flow passageway 54 when in the second position and allows partial flow through the flow passageway 54 when in any position between the first position and the second position.

The member 66 being a single element has an anisotropic density such that a first end 70 has a first end density and a second end 74 has a second end density and the balance of the member 66 has density values between the first end density and the second end density. The first end density and the second end density are both greater than a target fluid density of a target production fluid. Both the first end density and the second end density are less than a first fluid density of an unwanted production fluid, and the first end density is greater than a second fluid density while the second end density is less than the second fluid density. The second fluid density is between the target fluid density and the first fluid density and as such is necessarily representative of a mixture of the target production fluid and the unwanted production fluid, thereby allowing for a partial flow of fluid having the second fluid density. The forgoing configuration of densities allows the valve arrangement 62 to allow the target production fluid 18 with the target fluid density to have full flow area through the flow passageway 54. While preventing flow through the flow passageway 54 when the production fluid has an undesirable content of water resulting in the production fluid having the first fluid density. Yet still allow for some flow through the flow passageway 54 when the production fluid has an acceptable content of water at the selected second fluid density. The anisotropic density may be gradual density change between the first end 70 and the second end 74 or step change based on first or second fluid density.

The member 66 of this embodiment pivotally rotates about the first end 70 when moving between the first position and any position between the first position and the second position, then pivotally moves about the second end 74 when moving between any position between the first position and the second position and the second position. It is contemplated, however, that other embodiments could have the member 66 move in other ways depending upon how the anisotropic distribution of density is distributed through the member and the shape of the flow passageway 54 where the member 66 is engaged therewith. For example, the flow passageway 54 could have a round, square, triangular, trapezoidal, or any other cross-sectional shape, other than the arcuate shape depicted in the embodiment while still being covered by the claims herein. Similarly, the member 66 could have a round, square, triangular, trapezoidal, or any other cross-sectional shape, other than the arcuate shape depicted in the embodiment while still being covered by the claims herein. Additionally, the shape and volume of the member 66 is configured such that the member 66 is neutrally buoyant in undesirable fluids to be restricted.

Figure 6:
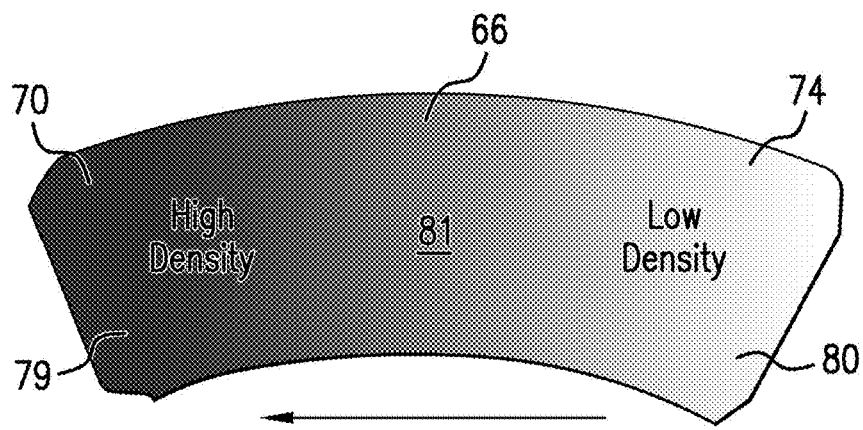
FIG. 6 depicts a member of the valve arrangement of FIG. 3.
Figure 7:
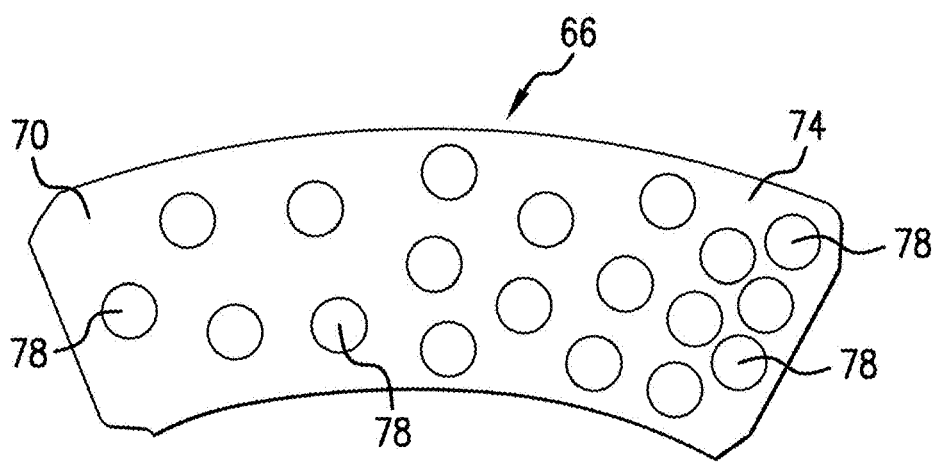
FIG. 7 depicts one embodiment of the member.

FIGS. 6 through 10 illustrate various embodiments of the member 66, each having a different way of defining the anisotropic density. FIG. 7 shows how a plurality of voids 78 sealed within the member 66 can be distributed within the member 66 such that the first end 70 has greater density than the second end 74. While this embodiment shows the voids 78 as being round and all of similar size, other embodiments can have voids that are other shapes, including irregular and random shapes, and of various sizes.

With reference to FIG. 6 specifically, in one embodiment the member 66 is made of two materials, a first material 79 having a first density and second material 80 having a second density, the first density being greater than the second density. The member 66 can have a ratio of the first material 79 to the second material 80 vary, possibly continuously thereby defining a gradient of densities between the first end 70 and the second end 74. This gradient of densities may be gradual density change between the first end 70 and the second end 74. A center 81 of the member 66 of this embodiment may have a density halfway between the first density and the second density. Such an embodiment may be made via additive manufacturing, as well as by other means such as welding, for example.

Figure 8:
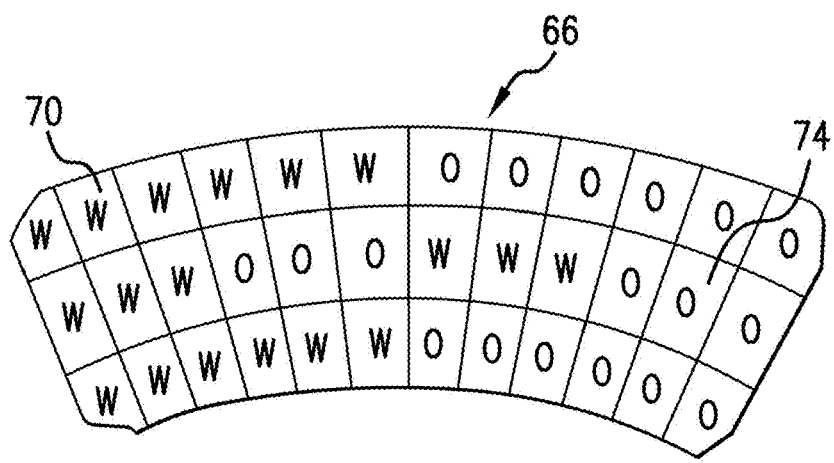
FIG. 8 depicts another embodiment of the member.

The embodiment of FIG. 8 shows the voids 78 being of similar size and shape to one another but they are filled with substances, fluids designated as water W and oil O in this case, having different densities such that the distribution of water and oil in the various voids 78 creates the anisotropic density that is desired. Alternatively, the substances could include gas as one of the fluids.

Figure 9:
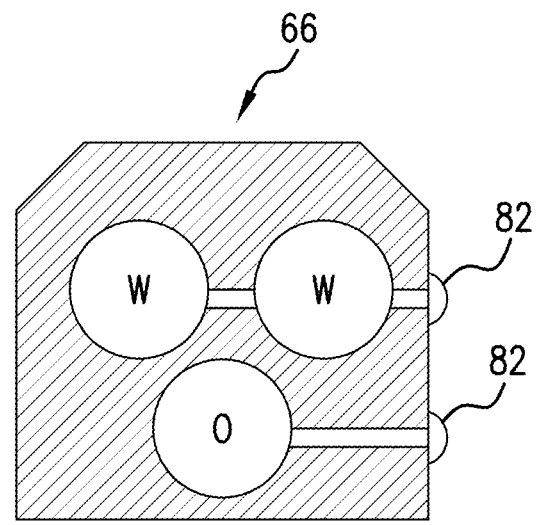
FIG. 9 depicts yet another embodiment of the member.
Figure 10:
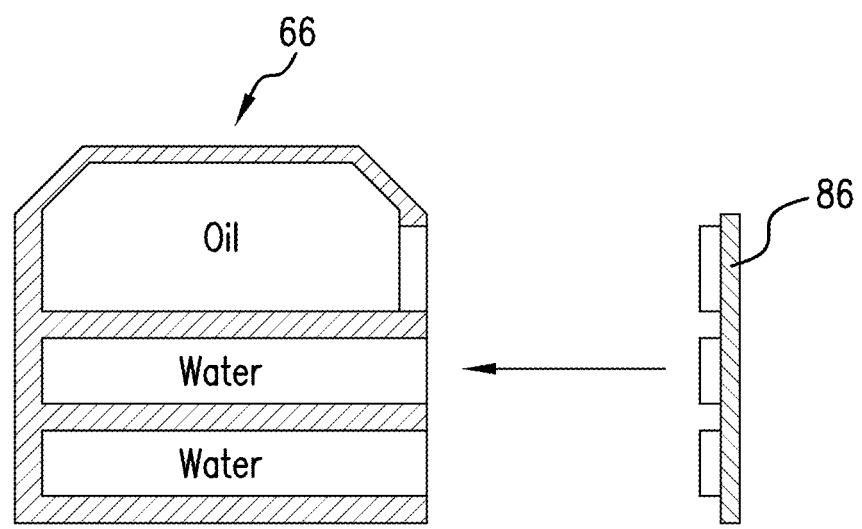
FIG. 10 depicts yet one more embodiment of the member.

FIGS. 9 and 10 depict embodiments that allow for the placement of water and oil and/or gas within cavities 72 formed in the member 66, after which the cavities 72 are sealed. The embodiment of FIG. 9 seals the cavities 72 with a weld bead 82, while the embodiment of FIG. 10 seals the cavities 72 with a cover 86 that can be attached with adhesive, welding or other means.

Figure 11:
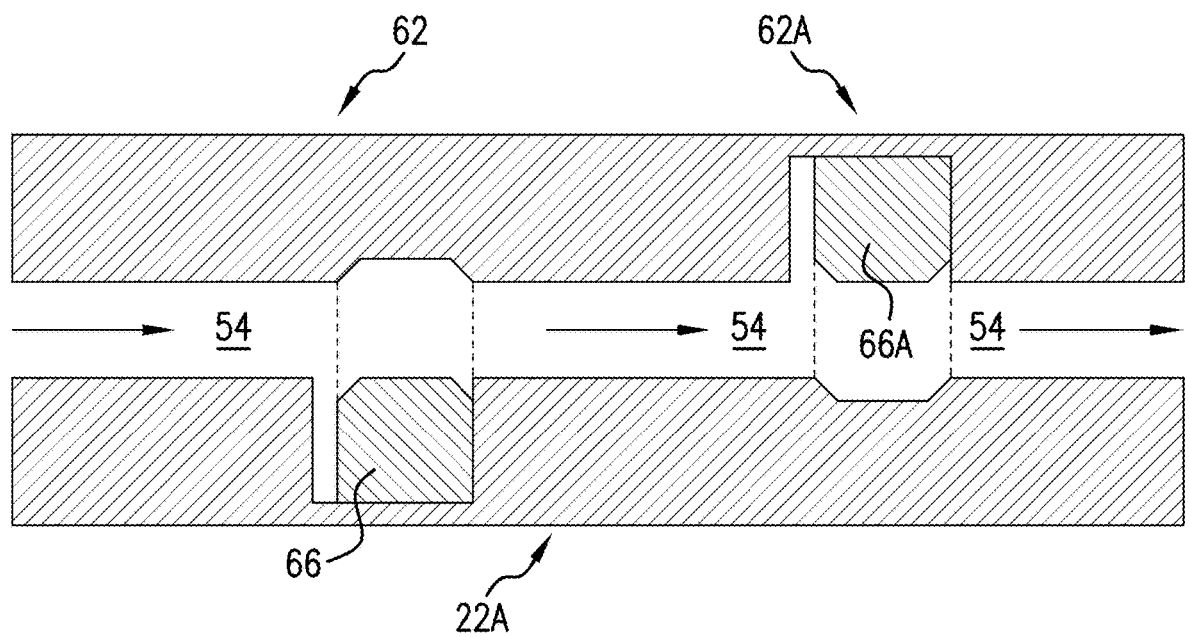
FIG. 11 depicts an embodiment of an inflow control device having two valve arrangements.
Figure 12:
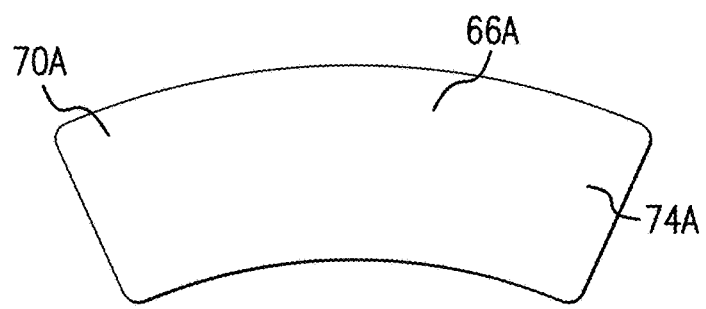
FIG. 12 depicts one of the members shown in FIG. 11.

Referring to FIGS. 11 and 12, an embodiment includes of an inflow control device 22A having two valve arrangements. The first valve arrangement 62 is the same as previously illustrated. The second valve arrangement 62A, acts in a similar fashion but is configured to block flow of a fluid, such as a gas, i.e. air or natural gas, that is less dense than the target production fluid, i.e. oil. A member 66A of the valve arrangement 62A has an anisotropic density such that a first end 70A has a first end density and a second end 74A has a second end density and the balance of the member 66A has density values between the first end density and the second end density. The first end density and the second end density are both less than a target fluid density of a target production fluid. Both the first end density and the second end density are greater than a first fluid density of an unwanted production fluid, and the first end density is greater than a second fluid density of a fluid having a desired reduced production flow, while the second end density is less than the second fluid density. The second fluid density is between the target fluid density and the first fluid density and as such is necessarily representative of a mixture of the target production fluid and the unwanted production fluid, thereby allowing for a partial flow of fluid having the second fluid density. The forgoing configuration of densities allows the valve arrangement 62A to allow the target production fluid 18 with the target fluid density to have full flow area through the flow passageway 54. While preventing flow through the flow passageway 54 when the production fluid has an undesirable content of gas or air resulting in the production fluid having the first fluid density. Yet still allow for some flow through the flow passageway 54 when the production fluid has an acceptable content of gas or air at the selected second fluid density.

While it should be appreciated that the valve arrangement 62A can act alone, having it positioned in series with one of the valve arrangements 62 can provide an inflow control device 22A that has the ability to partially or fully block both fluids with undesirably high density levels as well as undesirably low density levels.

Some embodiments of the member 66 and the orientation module 46 disclosed, may be made via an additive manufacturing process. Such a process could include depositing material layer-by-layer and adhering each new layer to the previously deposited layer. This process lends itself well to making the member 66 and/or orientation module 46 each as a single piece having anisotropic density as discussed in the embodiments above. This process can include forming the internal voids 57, 78, as well as making a single piece member 66 having the varying ratios of the materials 79 and 80 across the member 66.

The embodiments illustrated show the member 66 as being configured to directly allow, block or partially block flow through the flow passageway 54. However, it should be understood that in alternate embodiments the member 66 may be in operable communication with the inflow control device 22 to allow, block or partially block flow through the flow passageway 54 without the member 66 being directly in fluidic communication with the flow passageway 54.

Set Forth Below are Some Embodiments of the Foregoing Disclosure:

Embodiment 1: A wellbore system including a production string, an inflow control device positioned at a zone along the production string, and a member being a single element and in operable communication with the inflow control device, the member having anisotropic density and being configured to move relative to the inflow control device to cause the inflow control device to allow, fully block or partially block flow from the zone to the production string based on a density of a fluid flowing into the inflow control device from the zone.

Embodiment 2: The wellbore system of any prior embodiment, wherein the inflow control device including a valve arrangement defining a flow passageway configured to be positioned in fluid communication between a production zone of a formation and a production string the member being in operable communication with the flow passageway movable between at least a first position, and a second position, the member allowing flow through the flow passageway when in the first position, blocking flow through the flow passageway when in the second position, and allowing partial flow through the flow passageway when in any position between the first position and the second position, the member having a first end having a first end density and a second end having a second end density, the balance of the member having density between the first end density and the second end density, both the first end density and the second end density being greater than a target fluid density of a target production fluid, both the first end density and the second end density being less than a first fluid density of a first fluid unwanted for production, the first end density being greater than a second fluid density and the second end density being less than the second fluid density, the second fluid density being between the target fluid density and the first fluid density.

Embodiment 3: The wellbore system of any prior embodiment, wherein the fluid flowing into the inflow control device from the zone includes at least one or more of; water, oil and a gas.

Embodiment 4: The wellbore system of any prior embodiment, wherein the inflow control device includes a valve arrangement defining a flow passageway configured to be positioned in fluid communication between a production zone of a formation and a production string the member being in operable communication with the flow passageway movable between at least a first position, and a second position, the member allowing flow through the flow passageway when in the first position, blocking flow through the flow passageway when in the second position, and allowing partial flow through the flow passageway when in any position between the first position and the second position, the member having a first end having a first end density and a second end having a second end density, the balance of the member having density between the first end density and the second end density, both the first end density and the second end density being less than a target fluid density of a target production fluid, both the first end density and the second end density being greater than a first fluid density of a first fluid unwanted for production, the first end density being greater than a second fluid density and the second end density being less than the second fluid density, the second fluid density being between the target fluid density and the first fluid density.

Embodiment 5: The wellbore system of any prior embodiment, wherein the anisotropic density of the member is defined by a gradient from a first end of the member to a second end of the member.

Embodiment 6: The wellbore system of any prior embodiment further comprising a flow conditioning arrangement configured to mix at least the target production fluid and water flowing through the inflow control device to increase homogeneity of the fluids being mixed.

Embodiment 7: A member being a single element for controlling flow through an inflow control device comprising anisotropic density configured to move the member relative to the inflow control device such that the inflow control device allows, fully blocks, or partially blocks flow from a zone to a production string based on a density of a fluid flowing into the inflow control device from the zone.

Embodiment 8: The member of any prior embodiment wherein the anisotropic density of the member is defined as a gradient from a first end of the member to a second end of the member.

Embodiment 9: The member of any prior embodiment wherein the gradient defines a gradual density change between the first end and the second end.

Embodiment 10: The member of any prior embodiment wherein the anisotropic density is defined by varying at least one of sizes, shapes and positional distribution of voids within the member, such that the member is neutrally buoyant in undesirable fluids.

Embodiment 11: The member of any prior embodiment wherein the anisotropic density is defined by cavities within the member being at least partially filled with substances having different densities.

Embodiment 12: The member of any prior embodiment wherein the substances are fluids.

Embodiment 13: The member of any prior embodiment wherein the fluids include at least two of the following, water, oil and a gas.

Embodiment 14: The member of any prior embodiment wherein the member is additively manufactured.

Embodiment 15: The member of any prior embodiment wherein the anisotropic density is defined by a ratio of a first material and a second material that varies between a first end and a second end of the member, the first material having greater density than the second material.

Embodiment 16: A method of making a valve arrangement for an inflow control device, the valve arrangement having member in operable communication with a flow passageway, the member being movable between at least a first position and a second position, the member allowing flow through the flow passageway when in the first position, blocking flow through the flow passageway when in the second position, and allowing partial flow through the flow passageway when in any position between the first position and the second position, the method including depositing material layer-by-layer; and adhering each new layer to the previously deposited layer, thereby building via additively manufacturing, the member such that the member is a single element having anisotropic density such that a first end density of a first end of the member is greater than a second end density of a second end of the member, the first end density and the second end density both being either greater than or both being less than a target fluid density of a target production fluid and both being either greater than or both being less than a first fluid density of an unwanted production fluid, the first end density being less than a second fluid density, the second end density being greater than the second fluid density, the second fluid density being between the target fluid density and the first fluid density.

Embodiment 17: The method of any prior embodiment further including leaving a plurality of voids within the member; and sizing, shaping and distributing the plurality of voids within the member to define the anisotropic density.

Embodiment 18: The method of any prior embodiment further including leaving a plurality of cavities within the member; and filling at least partially the cavities with at least a first substance and a second substance, the first substance having a different density than the second substance; and sealing openings in the member through which the first substance and the second substance are deposited in the cavities.

Embodiment 19: The method of any prior embodiment wherein the depositing includes depositing at least two materials, a first of the two materials having a first material density and a second of the two materials having a second material density, the first material density being greater than the second material density.

Embodiment 20: The method of any prior embodiment wherein the anisotropic density is defined as a gradient in density between the first end and the second end of the member.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A method of making a valve arrangement for an inflow control device, the valve arrangement having a member in operable communication with a flow passageway, the member being movable between at least a first position and a second position, the member allowing flow through the flow passageway when in the first position, blocking flow through the flow passageway when in the second position, and allowing partial flow through the flow passageway when in any position between the first position and the second position, the method comprising:

depositing material layer-by-layer; and adhering each new layer to a previously deposited layer, thereby building via additively manufacturing, the member such that the member is a single element having anisotropic density such that a first end density of a first end of the member is greater than a second end density of a second end of the member, the first end density and the second end density both being either greater than or both being less than a target fluid density of a target production fluid and both being either greater than or both being less than a first fluid density of an unwanted production fluid, the first end density being greater than a second fluid density, the second end density being less than the second fluid density, the second fluid density being between the target fluid density and the first fluid density.

2. The method of claim 1 further comprising:

leaving a plurality of voids within the member; and sizing, shaping and distributing the plurality of voids within the member to define the anisotropic density.

3. The method of claim 1 further comprising:

leaving a plurality of cavities within the member; and filling at least partially the cavities with at least a first substance and a second substance, the first substance having a different density than the second substance; and sealing openings in the member through which the first substance and the second substance are deposited in the cavities.

4. The method of claim 1 wherein the depositing includes depositing at least two materials, a first of the two materials having a first material density and a second of the two materials having a second material density, the first material density being greater than the second material density.

5. The method of claim 1 wherein the anisotropic density is defined as a gradient in density between the first end and the second end of the member.

\* \* \* \* \*